United States Patent Office 3,100,218
Patented Aug. 6, 1963

3,100,218
PURIFICATION OF DIETHYLALUMINUM CHLORIDE WITH CRYSTALLINE TITANIUM TRICHLORIDE
Paul D. May, Galveston, and Erwin Kohn, Texas City, Tex., assignors to Monsanto Chemical Company, St. Louis, Mo., a corporation of Delaware
No Drawing. Filed July 20, 1961, Ser. No. 125,376
3 Claims. (Cl. 260—448)

The present invention relates to a method for preparation of substantially pure dialkylaluminum halides.

Organoaluminum compounds are very useful as components of catalyst systems employed in the polymerization of monoolefins. As is well known, α-olefins can be polymerized according to the so-called Ziegler process at relatively low temperatures and atmospheric pressure by contacting the olefin with a catalyst produced by mixing a compound of titanium with an organoaluminum compound. An especially effective and practical catalyst for the polymerization of α-olefins is titanium trichloride activated by an alkylaluminum compound. The properties of the polymer product with this type of catalyst vary markedly with the type of organoaluminum compound used to activate the TiCl$_3$. To selectively produce crystalline or isotactic polymers in preference to amorphous or atactic polymers when polymerizing propylene, for example, it is necessary to activate the TiCl$_3$ with either a trialkylaluminum or a dialkylaluminum halide and it has now been established that the use of the latter compound alone results in a product having the highest percentage of isotactic polypropylene. It is difficult, however, to achieve the maximum percentage of isotacticity in the polymer product because the dialkylaluminum halides presently available commercially are not pure compounds but contain impurities such as trialkylaluminums and dialkylaluminum hydrides which decrease considerably the percentage of crystalline or isotactic polypropylene obtainable. For optimum efficiency as catalyst constituents, these commerical dialkylaluminum halides must, therefore, be purified. Generally, they are subjected to fractionation by chemical or physical means to isolate the desired pure compounds but such methods are both time-consuming and expensive. Separation by fractional distillation, for example, requires a fairly extended fractionation under reduced pressure (approximately 10 mm. Hg) and in a nitrogen atmosphere since the compounds are pyrophoric.

It is an object of the present invention, therefore, to provide an improved method of purifying dialkylaluminum halides.

It is a further object of the present invention to provide a relatively simple, efficient and inexpensive method for the purification of dialkylaluminum halides suitable for use in the stereospecific polymerization of α-olefins.

Other and further objects and advantages of the invention will become apparent to those skilled in the art upon consideration of the accompanying disclosure.

According to the invention, dialkylaluminum halides can be obtained in pure form by a novel method of purification which comprises contacting an impure dialkylaluminum halide with solid powdered titanium trichloride and thereafter recovering the pure dialkylaluminum halide by decantation or filtration from the titanium trichloride upon which the impurities have been preferentially adsorbed.

The method of the invention is illustrated in the following examples which, however, are not to be construed as limiting it in any manner whatsoever.

Example 1

Propylene was polymerized using a catalyst prepared by mixing 13.4 millimoles of a commercial diethylaluminum chloride (purity <85% in n-hexane and 5.4 millimoles of aluminum-reduced titanium trichloride (3TiCl$_3$·AlCl$_3$)

in n-hexane for about 20 minutes. The polymerization was carried out in a closed cylindrical stainless steel vessel having a capacity of three liters and equipped with a charging bomb, a thermometer and gas inlet means to provide for flushing the reactor with an inert gas prior to introduction of the reactants. External heating and cooling was provided by means of circulating oil through an outside jacket of the reactor.

The reactor was charged with about one liter of n-hexane after it had been thoroughly dried and purged of air. To this was added by way of the charging bomb a slurry of the catalyst in another 1000 ml. of n-hexane. The catalyst mixture was heated to a temperature of about 50° C. and propylene was introduced at a rate to give a pressure of about 50 p.s.i.g. while the contents of the reactor were thoroughly and continuously agitated over a period of about 2 hours. Temperature during this reaction period was maintained at about 65–70° C.

At the end of the 2-hour period, the catalyst was quenched by adding methanol to the reaction mixture. The resulting slurry was then filtered in the absence of air to recover the polymer. The polymer cake was thoroughly washed with methanol and then dried in a vacuum oven at 65° C. for 16 hours. The polymer obtained was subjected to extraction with boiling n-heptane and it was found to contain 91.5% insoluble, i.e., crystalline or isotactic, polymer.

Example 2

The diethylaluminum chloride used in preparing the catalyst of Example 1 was purified by distillation through a 10-plate column at a pressure of 10 mm. of Hg and a reflux ratio of 10:1 to obtain a product containing 97+% of diethylaluminum chloride. This pure alkylaluminum compound was then combined with titanium trichloride and the resulting catalyst was employed in the polymerization of propylene in a manner identical to that described in Example 1. The amount of isotactic propylene obtained in this instance with the purified diethylaluminum chloride as determined by insolubility in boiling n-heptane was 95.0%.

Example 3

About 20 ml. of the same commercial diethylaluminum chloride employed in Example 1 was charged to a flask containing 5 g. of solid powdered titanium trichloride in a nitrogen-filled dry box and the contents of the flask were agitated for about 25 minutes to effect thorough contacting between the solid and liquid. The liquid diethylaluminum chloride was then recovered by filtration of the mixture. This treated diethylaluminum chloride was used to activate titanium trichloride and the mixture was employed as a catalyst for the polymerization of propylene under the same conditions employed in Eamples 1 and 2. The polymer product was found to be 94.9% insoluble in boiling n-heptane indicating an amount of isotactic polypropylene essentially the same as that produced in Example 2 with diethylaluminum chloride purified by distillation.

The purification process of the invention is not to be considered as limited to the precise conditions or mode of operation set out in Example 3. Any dialkylaluminum halide, for example, can be purified by the present method. Dialkylaluminum halides amenable to such treatment have the formula AlR$_2$X wherein R is an alkyl group and X is a halogen atom. Preferably, R is an alkyl radical containing from 2 to 4 carbon atoms and the R radicals may be different alkyl groups. It is preferred that X be chlorine, bromine, or iodine and particularly preferred is chlorine. Specific compounds in addition to the dialkylaluminum chloride exemplified which can be purified by the present process include diethylaluminum bromide, diethylaluminum iodide, diisobutylaluminum chloride, ethylbutylaluminum chloride, dipropylaluminum iodide, ethylpropylaluminum chloride, dimethylaluminum chloride and the like.

Aluminum-reduced titanium trichloride, i.e., titanium trichloride which has been prepared by reduction of titanium tetrachloride with aluminum metal and contains aluminum chloride in solid solution ($3TiCl_3 \cdot AlCl_3$), is the preferred treating agent for purifying the dialkylaluminum halides. However, any of the several alpha or so-called "violet" forms of titanium trichloride is also suitable. These crystalline salts are generally prepared by reduction of titanium tetrachloride with hydrogen at high temperatures, with titanium metal at 400° C. or as mentioned above with aluminum metal.

The process may be either a batch or continuous one. Contacting may be effected by slurrying the solid titanium trichloride with the dialkylaluminum halide or by percolating the dialkylaluminum halide through a column or bed packed with the solid powdered titanium trichloride.

The time of contact depends upon the amounts of impurities present and the efficiency of removal desired. The period during which the dialkylaluminum halide is in contact with the titanium trichloride may be controlled in the percolation method, for example, by adjustment of the length of the column. In practical operation, a series of columns may be employed, the outflow from one column, if it is not completely pure, being cycled through the next, until the effluent dialkylaluminum halide is substantially pure.

Because of their pyrophoric nature, the dialkylaluminum halides must be kept out of contact with air during the purification process. Hence, the purification is suitably conducted in a nitrogen-filled dry box or under an atmosphere of inert gas. Likewise, precautions must be taken to conduct the purification under anhydrous conditions since even traces of moisture react with the dialkylaluminum halides and result in poor efficiency in the process.

In carrying out the process of the invention, the temperature at which the adsorption treatment is effected is most conveniently the ambient temperature of the area. However, there is no reason why temperatures lower than the ambient temperature cannot be used provided they are kept within the range at which the dialkylaluminum halides flow sufficiently readily for easy handling. Likewise, temperatures above the ambient can be employed so long as they are kept well below that at which the dialkylaluminum halides are subject to decomposition.

What is claimed is:

1. A method for the purification of diethylaluminum chloride which comprises intimately contacting said diethylaluminum chloride with crystalline titanium trichloride and filtering the resulting slurry to recover the liquid diethylaluminum chloride.

2. The process of claim 1 wherein said titanium trichloride is in the form of a violet salt.

3. The process of claim 1 wherein the titanium trichloride has been prepared by reduction of titanium tetrachloride by aluminum metal.

References Cited in the file of this patent

FOREIGN PATENTS 543,259    Belgium _____ May 30, 1956

OTHER REFERENCES

Natta: Journal of Polymer Science, XXXIV, pages 21–48 (1959).

Gaylord et al.: Linear and Stereoregular Addition Polymers, pages 110–111, Interscience Publishers, Inc., New York, 1959.